(12) United States Patent
Gao et al.

(10) Patent No.: US 12,519,302 B2
(45) Date of Patent: Jan. 6, 2026

(54) CALIBRATING METHOD AND SYSTEM OF SETTING VALUE OF GRID-RELATED RELAY PROTECTION OF NEW ENERGY STATION

(71) Applicant: INNER MONGOLIA POWER (GROUP) CO., LTD INNER MONGOLIA POWER RESEARCH INSTITUTE, Huhhot (CN)

(72) Inventors: Chen Gao, Huhhot (CN); Minfu A, Huhhot (CN); Zaixin Yang, Huhhot (CN); Lixin Xing, Huhhot (CN); Ming Zhong, Huhhot (CN); Tao Han, Huhhot (CN); Rulei Han, Huhhot (CN); Sitai Ya, Huhhot (CN); Wei Zhang, Huhhot (CN); Guangfei Lv, Huhhot (CN)

(73) Assignee: INNER MONGOLIA POWER (GROUP) CO., LTD INNER MONGOLIA POWER RESEARCH INSTITUTE, Huhhot (CN)

( * ) Notice: Subject to any disclaimer, the term of this patent is extended or adjusted under 35 U.S.C. 154(b) by 152 days.

(21) Appl. No.: 18/598,036

(22) Filed: Mar. 7, 2024

(65) Prior Publication Data
US 2025/0030233 A1 Jan. 23, 2025

(30) Foreign Application Priority Data
Jul. 20, 2023 (CN) .......................... 202310899269.7

(51) Int. Cl.
H02H 3/00 (2006.01)
H02H 1/00 (2006.01)
H02H 7/22 (2006.01)

(52) U.S. Cl.
CPC .......... *H02H 3/006* (2013.01); *H02H 1/0092* (2013.01); *H02H 7/222* (2013.01)

(58) Field of Classification Search
None
See application file for complete search history.

(56) References Cited

U.S. PATENT DOCUMENTS 10,436,178 B2 * 10/2019 Hales ...................... F03D 7/028
2007/0273546 A1 * 11/2007 Viaro ..................... H02H 3/006
340/691.1

(Continued)

*Primary Examiner* — Stephen W Jackson
(74) *Attorney, Agent, or Firm* — Bayramoglu Law Offices LLC (57) ABSTRACT

Provided are calibrating method and system of setting value of grid-related relay protection of new energy station, wherein generating module of calibrating template generates setting value calibrating template of target new energy station based on names of each of protective setting value items and units of each of protective setting value items of target new energy station; generating module of setting value table to be calibrated generates setting value table to be calibrated of target new energy station based on actual values of each of protective setting value items and setting value calibrating template; determining module of standard setting value table determines standard setting value table of target new energy station from protective setting value calibration database according to new energy station number of target new energy station; and calibrating module of protective setting value calibrates setting value table to be calibrated according to standard setting value table.

10 Claims, 3 Drawing Sheets

(56) References Cited

U.S. PATENT DOCUMENTS

| | | | |
|---|---|---|---|
| 2015/0189705 A1* | 7/2015 | Ghosh | H02J 3/466 |
| | | | 315/161 |
| 2017/0085091 A1* | 3/2017 | Kamalasadan | H02J 3/00 |
| 2018/0358839 A1* | 12/2018 | Perez | H02J 3/46 |

* cited by examiner

CALIBRATING METHOD AND SYSTEM OF SETTING VALUE OF GRID-RELATED RELAY PROTECTION OF NEW ENERGY STATION

CROSS REFERENCE TO RELATED APPLICATIONS

The present disclosure claims priority to Chinese Patent Application No. 202310899269.7, filed with the Chinese Patent Office on Jul. 20, 2023, entitled "Calibrating Method and System of Setting Value of Grid-related Relay Protection of New Energy Station", the entirety of which is incorporated herein by reference.

TECHNICAL FIELD

The present disclosure relates to the technical field of the new energy station management, and specifically relates to a calibrating method and system of setting value of grid-related relay protection of new energy station.

BACKGROUND ART

The relay protection for the power system is an important part of the power system, which plays a significantly important role in ensuring the safety and stability of the power system and the economic operation. The effective and timely work for management of the relay protection is a powerful guarantee for the safe and stable operation of a power grid. The protective setting parameter necessary for relay protection in the power system is a type of numerical parameter corresponding to the activation of protective action and is set to ensure that the equipment does not work beyond the permissible range. The correctness of the setting value of grid-related relay protection of the new energy station directly affects the reliability of the power supply of a grid connection point. If the management of the setting value of grid-related relay protection does not meet the requirement, it will lead to a large-scale disconnection of the new energy station, which results in a fluctuation of voltage and frequency of the power grid, and the consequence will be immeasurable. Therefore, in order to ensure a normal operation for each new energy station in the new energy stations, it is necessary to calibrate the protective setting value recorded by each of the new energy stations.

In prior art, when the protective setting value initially recorded by each new energy station in the new energy station system is required to be calibrated, it is usually determined by the staff based on experience whether the initially recorded protective setting value complies with regulations or meets operational requirements of the new energy station, so as to realize a calibration of the relay-protection setting value of the new energy station. In the study, it was found that since the types and amounts of protective setting value items of each of the new energy stations are larger, the workload of the staff is larger when the calibration is performed manually by the staff, which requires a large amount of labor costs. At the same time, when the staff determines whether the initially recorded protective setting value complies with the regulations based on the experience, it may lead to the occurrence of misjudgment due to the inexperience of the staff, so as to reduce the accuracy of the calibration result obtained after calibrating the relay-protection setting value of the new energy station.

SUMMARY

In view of this, the objective of the present disclosure is to provide a calibrating method and system of setting value of grid-related relay protection of new energy station to reduce labor costs required to be consumed when calibrating the relay-protection setting value of the new energy station, and at the same time to improve the accuracy of a calibration result obtained after calibrating the relay-protection setting value of the new energy station.

In a first aspect, embodiments of the present disclosure provide a calibrating method of setting value of grid-related relay protection of new energy station, which is applied to a calibrating system of setting value of grid-related relay protection of new energy station, wherein the system includes a generating module of calibrating template, a generating module of setting value table to be calibrated, a determining module of standard setting value table, and a calibrating module of protective setting value. The method includes:

generating a setting value calibrating template of a target new energy station by the generating module of calibrating template based on names of each of protective setting value items and units of each of protective setting value items of the target new energy station;

generating a setting value table to be calibrated of the target new energy station by the generating module of setting value table to be calibrated based on actual values of each of the protective setting value items input by a user and the setting value calibrating template;

determining a standard setting value table of the target new energy station from a protective setting value calibration database by the determining module of standard setting value table according to a new energy station number of the target new energy station, wherein the standard setting value table includes standard values of each of the protective setting value items of the target new energy station; and calibrating the setting value table to be calibrated by the calibrating module of protective setting value according to the standard setting value table.

Optionally, the setting value calibrating template includes a plurality of items, wherein each of the protective setting value items includes a name and a unit of one protective setting value item; and the step of generating the setting value table to be calibrated of the target new energy station by the generating module of setting value table to be calibrated based on the actual values of each of the protective setting value items input by the user and the setting value calibrating template includes:

the generating module of setting value table to be calibrated adding, for each of the protective setting value items, the actual value of the protective setting value item into the item in the setting value calibrating template where the name of the protective setting value item is located, so as to obtain the setting value table to be calibrated.

Optionally, the step of calibrating the setting value table to be calibrated by the calibrating module of protective setting value according to the standard setting value table includes:

determining whether the actual value of the protective setting value item in the setting value table to be calibrated is the same as the standard value of the protective setting value item in the standard setting value table by the calibrating module of protective setting value for each of the protective setting value items; and updating the actual value of the protective setting value item in the setting value table to be calibrated by utilizing the standard value of the protective setting value item by the calibrating module of protective setting value, so as to obtain an optimized setting value table, if the actual value of the protective setting value item in the setting value table to be calibrated is different from the standard value of the protective setting value item in the standard setting value table.

Optionally, the system further includes a calibrating alarm module; if the actual value of the protective setting value item in the setting value table to be calibrated is different from the standard value of the protective setting value item in the standard setting value table, the method further includes:

sending an alarm message to the user by the calibrating alarm module; or, sending an alarm warning tone to the user by the calibrating alarm module.

Optionally, the system further includes a controlling module of operating state of new energy station, and after the calibrating module of protective setting value updates the actual value of the protective setting value item in the setting value table to be calibrated by utilizing the standard value of the protective setting value item and obtains the optimized setting value table, the method further includes:

controlling the operating state of the target new energy station by the controlling module of operating state of the new energy station by utilizing the optimized setting value table.

Optionally, after the calibrating module of protective setting value determines whether the actual value of the protective item in the setting value table to be calibrated is the same as the standard value of the protective setting value item in the standard setting value table, the method further includes:

controlling the operating state of the target new energy station by the controlling module of operating state of the new energy station by utilizing the setting value table to be calibrated, if the actual value of the protective setting value item in the setting value table to be calibrated is the same as the standard value of the protective setting value item in the standard setting value table.

Optionally, the system further includes a generating module of calibration database, and before the step of determining the standard setting value table of the target new energy station from the protective setting value calibration database by the determining module of standard setting value table according to the new energy station number of the target new energy station, the method further includes:

recognizing a text in contents included in technical regulations for which a photovoltaic power station is accessed into a power system and technical regulations for which a wind power station is accessed into the power system by the generating module of calibration database and obtaining a recognition result; and generating the protective setting value calibration database according to the recognition result by the generating module of calibration database.

In a second aspect, the embodiments of the present disclosure provide a calibrating system of setting value of grid-related relay protection of new energy station, wherein the system includes the generating module of calibrating template, the generating module of setting value table to be calibrated, the determining module of standard setting value table, and the calibrating module of protective setting value.

The generating module of calibrating template is configured to generate a setting value calibrating template of a target new energy station based on names of each of protective setting value items and the units of each of protective setting value items of the target new energy station.

The generating module of setting value table to be calibrated is configured to generate a setting value table to be calibrated of the target new energy station based on actual values of each of the protective setting value items input by the user and the setting value calibrating template.

The determining module of standard setting value table is configured to determine a standard setting value table of the target new energy station from a protective setting value calibration database according to a new energy station number of the target new energy station, wherein the standard setting value table includes standard values of each of the protective setting value items of the target new energy station.

The calibrating module of protective setting value is configured to calibrate the setting value table to be calibrated according to the standard setting value table.

Optionally, the setting value calibrating template includes a plurality of items, wherein each of the protective setting value items contains a name and a unit of one protective setting value item; and when configured to generate the setting value table to be calibrated of the target new energy station based on actual values of each of the protective setting value items input by a user and the setting value calibrating template, the generating module of setting value table to be calibrated is specifically configured to:

add, for each of the protective setting value items, the actual value of the protective setting value item into the item in the setting value calibrating template where the name of the protective setting value item is located, so as to obtain the setting value table to be calibrated.

Optionally, when configured to calibrate the setting value table to be calibrated according to the standard setting value table, the calibrating module of protective setting value is specifically configured to:

determine whether the actual value of the protective setting value item in the setting value table to be calibrated is the same as a standard value of the protective setting value item in the standard setting value table for each of the protective setting value items; and update the actual value of the protective setting value item in the setting value table to be calibrated by utilizing the standard value of the protective setting value item, so as to obtain an optimized setting value table, if the actual value of the protective setting value item in the setting value table to be calibrated is different from the standard value of the protective setting value item in the standard setting value table.

Optionally, the system further includes the calibrating alarm module.

The calibrating alarm module is configured to send the alarm message to the user or send the alarm warning tone to the user, if the actual value of the protective setting value item in the setting value table to be calibrated is different from the standard value of the protective setting value item in the standard setting value table.

Optionally, the system further includes the controlling module of operating state of new energy station.

The controlling module of operating state of new energy station is configured to control the operating state of the target new energy station by utilizing the optimized setting value table after the calibrating module of protective setting value updates the actual value of the protective setting value item in the setting value table to be calibrated by utilizing the standard value of the protective setting value item and obtains the optimized setting value table.

Optionally, the controlling module of operating state of new energy station is further configured to control, if the actual value of the protective setting value item in the setting value table to be calibrated is the same as the standard value of the protective setting value item in the standard setting value table, the operating state of the target new energy station by utilizing the setting value table to be calibrated, after the calibrating module of protective setting value determines whether the actual value of the protective item in the setting value table to be calibrated is the same as the standard value of the protective setting value item in the standard setting value table.

Optionally, the system further includes the generating module of calibration database.

The generating module of calibration database is configured to recognize the text of the contents included in the technical regulations for which the photovoltaic power station is accessed into the power system and the technical regulation for which the wind power station is accessed into the power system and obtain the recognition result, before the step of determining the standard setting value table of the target new energy station from the protective setting value calibration database by the determining module of standard setting value table according to the new energy station number of the target new energy station.

The generating module of calibration database is configured to generate the protective setting value calibration database according to the recognition result.

The technical solutions provided by the present disclosure include, but are not limited to the following beneficial effects.

In the present disclosure, by the cooperation of the generating module of calibrating template, the generating module of setting value table to be calibrated, the determining module of standard setting value table, and the calibrating module of protective setting value, the setting value table to be calibrated is generated based on the actual value of the protective setting value item and the setting value calibrating template. Subsequently, by the calibration of the protective setting value item according to the setting value table to be calibrated and the corresponding standard setting value table in the protective setting value calibration database for the target new energy station to which it belongs, the comparison of the data of the protective setting value item by manual is avoided and the interference and impact of subjective human factors are avoided at the same time, thus reducing the labor costs required to be consumed when calibrating the relay-protection setting value of the new energy station and improving the accuracy of the calibration result obtained after calibrating the relay-protection setting value of the new energy station at the same time.

In order to make the above objectives, features, and advantages of the present disclosure more obvious and easier to be understood, the preferable embodiments together with the drawings are described in detail as follows.

BRIEF DESCRIPTION OF DRAWINGS

In order to more clearly illustrate the technical solutions of embodiments of the present disclosure, the following will briefly introduce the drawings required to be used in the embodiments. It should be understood that the following drawings only show certain embodiments of the present disclosure, and therefore should not be regarded as a limitation of the scope. For the person of ordinary skill in the art can obtain other relevant drawings according to these drawings without inventive efforts.

DETAILED DESCRIPTION OF EMBODIMENTS

In order to make the objectives, technical solutions, and advantages of the embodiments of the present disclosure clearer, the technical solutions in the embodiments of the present disclosure will be clearly and completely described below in conjunction with the drawings in the embodiments of the present disclosure. It is obvious that the described embodiments are only partial embodiments of the present disclosure, and not all of the embodiments. The components of the embodiments of the present disclosure generally described and illustrated in the drawings herein can be arranged and designed by a variety of different configurations. Therefore, the detailed description of the embodiments of the present disclosure provided in the following drawings is not intended to limit the scope of protection of the present disclosure, but represents only the selected embodiments of the present disclosure. Based on the embodiments of the present disclosure, all the other embodiments obtained by a person skilled in the art without inventive efforts shall belong to the scope of protection of the present disclosure.

Embodiment 1

Figure 1:
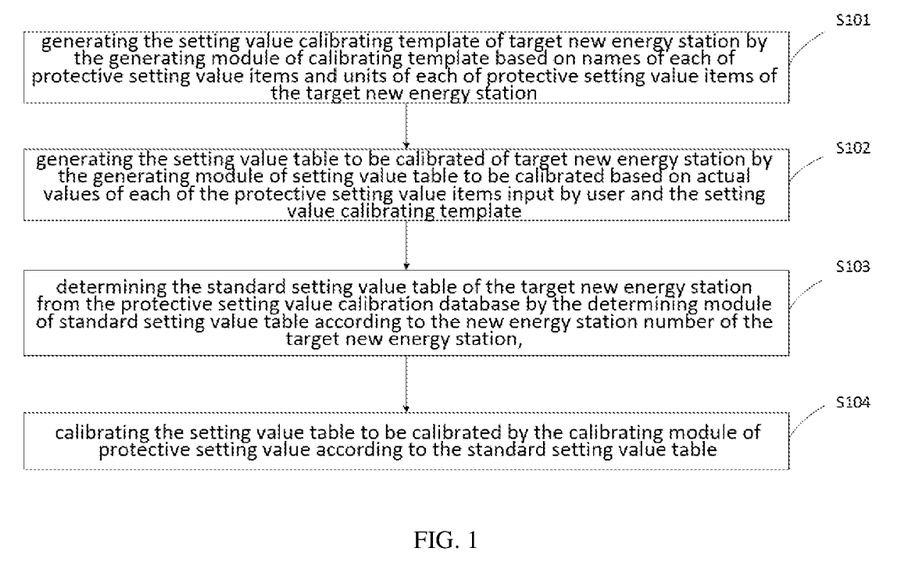
FIG. 1 shows a flow diagram of a calibrating method of setting value of grid-related relay protection of new energy station provided by one embodiment of the present disclosure.

In order to facilitate the understanding of the present disclosure, the following is a detailed description of the embodiment of the present disclosure, which is in conjunction with the contents described by the flow diagrams of a calibrating method of setting value of grid-related relay protection of new energy station provided by one embodiment of the present disclosure shown in FIG. 1.

Referring to FIG. 1, FIG. 1 shows a flow diagram of a calibrating method of setting value of grid-related relay protection of new energy station provided by the embodiment of the present disclosure, wherein the method includes the following steps S101~S104.

S101: generating the setting value calibrating template of the target new energy station by the generating module of calibrating template based on the names of each of protective setting value items and the units of each of protective setting value items of the target new energy station.

Specifically, the names of the protective setting value items include, but are not limited to, a high voltage value (corresponding to a unit of a volt), a low voltage value (corresponding to a unit of a volt), an offline operating duration (corresponding to a unit of second), and an operating frequency (corresponding to a unit of hertz) of the target new energy station. The setting value calibrating template includes the names and units of a plurality of protective setting value items required to be calibrated and input boxes configured to record actual values of each of the protective setting value items.

S102: generating the setting value table to be calibrated of the target new energy station by the generating module of setting value table to be calibrated based on actual values of each of the protective setting value items input by the users and the setting value calibrating template.

Specifically, the user inputs the actual values corresponding to the names of each of the protective setting value items into the input boxes of the setting value calibrating template, and the generating module of setting value table to be calibrated combines the names, the actual values, and the units of each of the protective setting value items to obtain the setting value table to be calibrated of the target new energy station.

S103: determining the standard setting value table of the target new energy station from the protective setting value calibration database by the determining module of standard setting value table according to the new energy station number of the target new energy station, wherein the standard setting value table includes standard values of each of the protective setting value items of the target new energy station.

Specifically, the protective setting value calibration database is pre-configured, which includes the standard setting value table of different new energy stations, wherein the standard setting value table includes the standard values of each of the protective setting value items of the target new energy station.

S104: calibrating the setting value table to be calibrated by the calibrating module of protective setting value according to the standard setting value table.

Specifically, the standard setting value table is usually stored in a central management terminal, and the setting value table to be calibrated is stored in execution terminals of each of the new energy stations. When calibrating and correcting the setting value table to be calibrated with reference to a standard setting value table, a calibrating regulation is as follows. If the actual value of a certain protective setting value item in the setting value table to be calibrated is different from the standard value of the protective setting value item in the standard setting value table, the actual value of the protective setting value item in the setting value table to be calibrated is corrected to the standard value of the protective setting value item in the standard setting value table, and thus, the actual value of the protective setting value item stored in the execution terminal of the new energy station in the target new energy station is consistent with the standard value of the central management terminal; and if the actual value of a certain protective setting value item in the setting value table to be calibrated is the same as the standard value of the protective setting value item in the standard setting value table, the actual value of the protective setting value item in the setting value table to be calibrated does not need to be corrected.

In a feasible embodiment, the setting value calibrating template includes a plurality of items, wherein each of the protective setting value items is the name and the unit of one protective setting value item; and
  the step of generating the setting value table to be calibrated of the target new energy station by the generating module of setting value table to be calibrated based on the actual values of each of the protective setting value items input by the user and the setting value calibrating template includes:
  the generating module of setting value table to be calibrated adding, for each of the protective setting value items, the actual value of the protective setting value item into the item in the setting value calibrating template where the name of the protective setting value item is located, so as to obtain the setting value table to be calibrated.

Specifically, for example, if the name of the protective setting value item is the operating frequency and its unit is Hertz, when the actual value of the operating frequency input by the user is 10, the setting value table to be calibrated comprising the item "operating frequency of 10 Hertz" can be obtained.

Figure 2:
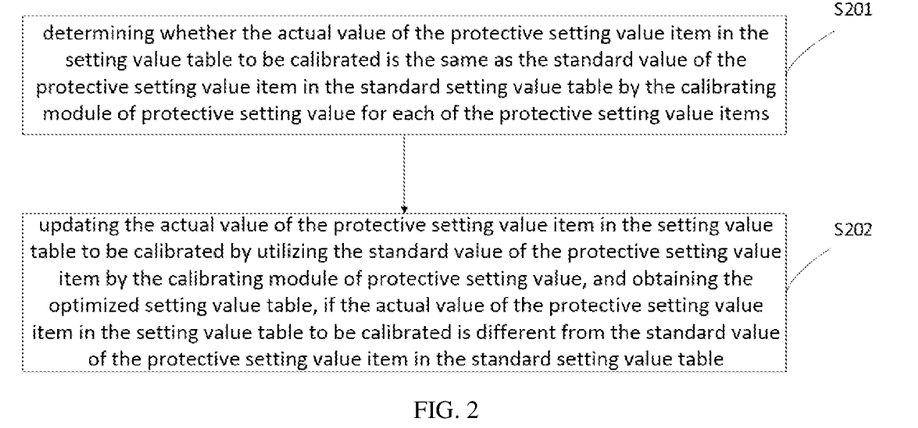
FIG. 2 shows a flow diagram of an updating method of a protective setting value provided by the embodiment of the present disclosure.

In a feasible embodiment, referring to FIG. 2, FIG. 2 shows a schematic flow diagram of an updating method of the protective setting value provided by the embodiment of the present disclosure, wherein the step of calibrating the setting value table to be calibrated by the calibrating module of protective setting value according to the standard setting value table includes the following steps S201~S202.

S201: determining whether the actual value of the protective setting value item in the setting value table to be calibrated is the same as the standard value of the protective setting value item in the standard setting value table by the calibrating module of protective setting value for each of the protective setting value items.

S202: updating the actual value of the protective setting value item in the setting value table to be calibrated by utilizing the standard value of the protective setting value item by the calibrating module of protective setting value, and obtaining the optimized setting value table, if the actual value of the protective setting value item in the setting value table to be calibrated is different from the standard value of the protective setting value item in the standard setting value table.

Specifically, if the actual value of the protective setting value item in the setting value table to be calibrated is different from the standard value of the protective setting value item in the standard setting value table, the actual value of the protective setting value item in the setting value table to be calibrated is required to be corrected on a correction basis of the standard value of the protective setting value item in the standard setting value table.

In a feasible embodiment, the system further includes the calibrating alarm module, and if the actual value of the protective setting value item in the setting value table to be calibrated is different from the standard value of the protective setting value item in the standard setting value table, the method further includes:
  sending an alarm message to the user by the calibrating alarm module; or sending an alarm warning tone to the user by the calibrating alarm module.

Specifically, if the actual value of the protective setting value item in the setting value table to be calibrated is different from the standard value of the protective setting value item in the standard setting value table, the alarm needs to be sent to the user, so that the user can be promptly informed of situations where the actual value is different from the standard value.

In a feasible embodiment, the system further includes the controlling module of operating state of new energy station. After the calibrating module of protective setting value updates the actual value of the protective setting value item in the setting value table to be calibrated by utilizing the standard value of the protective setting value item and obtains the optimized setting value table, the method further includes:

controlling the operating state of the target new energy station by the controlling module of operating state of the new energy station by utilizing the optimized setting value table.

Specifically, after completing the calibration for the actual value of the protective setting value item of the target new energy station, the operating state of the target new energy station is controlled by utilizing the optimized setting value table to ensure a safe operation of the target new energy station.

In a feasible embodiment, after the calibrating module of protective setting value determines whether the actual value of the protective item in the setting value table to be calibrated is the same as the standard value of the protective setting value item in the standard setting value table, the method further includes:

controlling the operating state of the target new energy station by the controlling module of operating state of the new energy station by utilizing the setting value table to be calibrated, if the actual value of the protective setting value item in the setting value table to be calibrated is the same as the standard value of the protective setting value item in the standard setting value table.

Specifically, in this case, the setting value table to be calibrated does not need to be corrected, and the operating state of the target new energy station can be controlled directly by utilizing the setting value table to be calibrated.

Figure 3:
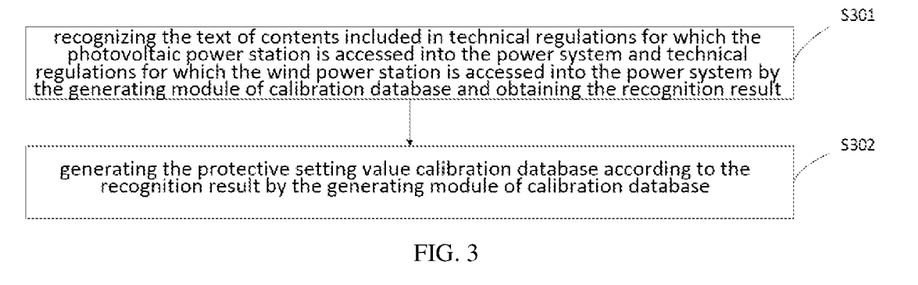
FIG. 3 shows a flow diagram of a generating method of calibration database of protective setting value provided by the embodiment of the present disclosure.

In a feasible embodiment, referring to FIG. 3, FIG. 3 shows the flow diagram of a generating method of calibration database of protective setting value provided by the embodiment of the present disclosure, wherein the system further includes the generating module of calibration database. Before the step of determining the standard setting value table of the target new energy station from the protective setting value calibration database by the determining module of standard setting value table according to the new energy station number of the target new energy station, the method further includes the following steps S301~S302.

S301: recognizing the text of contents included in technical regulations for which the photovoltaic power station is accessed into the power system and technical regulations for which the wind power station is accessed into the power system by the generating module of calibration database and obtaining the recognition result.

Specifically, the technical regulations for which the photovoltaic power station is accessed into the power system and the technical regulations for which the wind power station is accessed into the power system include the following contents.

1. When the voltage of the grid connection point of the photovoltaic power station drops to 0, a photovoltaic inverter in the photovoltaic power station should be guaranteed to operate continuously for 150 ms without being offline.
2. When the voltage of the grid connection point of the photovoltaic power station drops to 20% of the nominal voltage, the photovoltaic inverter in the photovoltaic power station should be guaranteed to operate continuously for 625 ms without being offline.
3. When the voltage of the grid connection point of the photovoltaic power station can be restored to 90% of the rated voltage within 2s after occurring a drop, the photovoltaic inverter in the photovoltaic power station should be guaranteed to operate continuously without being offline.
4. When the voltage of the grid connection point of the photovoltaic power station rises to 120% to 130% of the nominal voltage, the photovoltaic inverter in the photovoltaic power station should be guaranteed to operate continuously for 500 ms without being offline.
5. When the voltage of the grid connection point of the photovoltaic power station rises to 110% to 120% of the nominal voltage, the photovoltaic inverter in the photovoltaic power station should be guaranteed to operate continuously for 10s without being offline.
6. The ride through capabilities of low voltage and high voltage of reactive power compensation equipment of the photovoltaic power station are not poorer than a ride through capability of the photovoltaic inverter.
7. When the voltage of the grid connection point of the wind power station drops to 20% of the nominal voltage, the wind power unit in the wind power station should be guaranteed to operate continuously for 625 ms without being offline.
8. When the voltage of the grid connection point of the wind power station can be restored to 90% of the nominal voltage within 2s after occurring the drop, the wind power unit in the wind power station should be guaranteed to operate continuously without being offline.
9. When the voltage of the grid connection point of the wind power station rises to 125% to 130% of the nominal voltage, the wind power unit in the wind power station should be guaranteed to operate continuously for 500 ms without being offline.
10. When the voltage of the grid connection point of the wind power station rises to 120% to 125% of the nominal voltage, the wind power unit in the wind power station should be guaranteed to operate continuously for is without being offline.
11. When the voltage of the grid connection point of the wind power station rises to 110% to 120% of the nominal voltage, the wind power unit in the wind power station should be guaranteed to operate continuously for 10s without being offline.
12. The ride through capabilities of low voltage and high voltage of the reactive power compensation equipment of the wind power station are not poorer than the ride through capability of the wind power unit.
13. When the frequency is not lower than 48.5 Hz and not higher than 50.5 Hz, the photovoltaic power station should be able to operate normally; when the frequency is higher than 50.5 Hz but not higher than 51 Hz, the inverter is required to have the ability to operate for at least 2 min; when the per frequency is higher than 51 Hz and lower than 51.5 Hz, the inverter is required to have the ability to operate for at least 30s; and when the frequency is higher than 51.5 Hz, it depends on the highest frequency that the inverter operates.

14. When the frequency is lower than 48.5 Hz or higher than 48 Hz, the inverter is required to have the ability to operate for at least 5 min; when the frequency is lower than 48 Hz or higher than 47.5 Hz, the inverter is required to have the ability to operate for at least 60s; when the frequency is lower than 47.5 Hz or higher than 47 Hz, the inverter is required to have the ability to operate for at least 20s; when the frequency is lower than 47 Hz or higher than 46.5 Hz, the inverter is required to have the ability to operate for at least 5s; and when the frequency is lower than 46.5 Hz, it depends on the lowest frequency that the inverter operates.

15. When the frequency of the power grid exceeds a range of 48.5 Hz to 50.5 Hz, the inverter in shutdown state should not be connected to the grid at this time.

16. When the frequency is not lower than 48.5 Hz and not higher than 50.5 Hz, the wind power unit should be able to operate normally.

17. When the frequency is higher than 50.5 Hz but not higher than 51 Hz, a high frequency protection operation duration should be not less than 3 min, and the strategy of reducing the power or high frequency cutoff transmitted by the dispatching organization is executed; when the frequency is higher than 51 Hz but not higher than 51.5 Hz, the high frequency protection operation duration should be not less than 30s, and the strategy of reducing the power or high frequency cutoff transmitted by the dispatching organization is executed; and when the frequency is higher than 51.5 Hz, it should be depended on the highest frequency allowed to operate by the wind power unit in the wind power station.

18. When the frequency is lower than 48.5 Hz but not lower than 48 Hz, a low frequency protection operation duration should be not less than 30 min; when the frequency is lower than 48 Hz but not lower than 47.5 Hz, the low frequency protection operation duration should be not less than 60s; when the frequency is lower than 47.5 Hz but not lower than 47 Hz, the low frequency protection operation duration should be not less than 20s; when the frequency is lower than 47 Hz but not lower than 46.5 Hz, the low frequency protection operation duration should be not less than 5s; and when the frequency is lower than 46.5 Hz, it should be depended on the lowest frequency allowed to operate by the wind power unit in the wind power station.

19. The operating duration limit of three-phase voltage unbalance protection and three-phase current unbalance protection of the new energy station should be matched with the fault voltage ride-through. It is appropriate to block a three-phase unbalanced protection during the process of the fault ride-through. If the blocking cannot be realized, a delay of the unbalanced protective operation should be not less than 10s.

The text recognition is performed on the above to obtain recognition results; or the input results is obtained from the user input.

S302: generating the protective setting value calibration database according to the recognition result by the generating module of calibration database.

Specifically, the generating module of calibration database stores the above recognition result as the standard setting value table of the target new energy station to obtain the protective setting value calibration database.

Additionally, the calibrating system of setting value of grid-related relay protection of new energy station provided by the present disclosure further includes a graphic drawing module of new energy station, wherein the graphic drawing module of new energy station supporting the new energy station draws and stores various primary system graphics, which are mainly the following electrical components. The graphics mainly include the components of a fan, a photovoltaic, an external equivalent system, a two-winding transformer, a three-winding transformer, an autotransformer, a four-winding transformer, a reactor, a split reactor, a shunt capacitor, a motor, a circuit breaker, a switch, lines, a busbar, connecting lines, etc. The module having a graphical editing function can be realized as follows. (1) Each of the components can be added, deleted, and modified flexibly, and the graphics can be moved, dragged, rotated, colored, copied, and pasted, etc. (2) The graphics have navigation capabilities. (3) The functions of block selecting, block moving, block copying, and block pasting are provided. (4) The whole picture can be scrolled, zoomed in, zoomed out, restored, maximized, and minimized. (5) The topological relationships between components do not change during a movement of the components. All components are founded in a uniform and standard format including name, voltage level, original parameters, and per unit parameters. The positive sequence per unit value, the negative sequence per unit value, and the zero sequence per unit value of the parameters of the following various electrical components required by the fault calculation and the setting calculation can be obtained from the directly inputting or calculating according to relevant parameters. The parameters of the line, main transformer, busbar, and generator can be displayed on the main wiring diagram or the impedance diagram as required. The conditions of protective configurations of the fan, photovoltaic, transformer, and motor can be displayed on the graphics.

The calibrating system of setting value of grid-related relay protection of new energy station provided by the present disclosure can further complete a basic model construction of the new energy station, wherein the new energy station fills in various basic materials required by the platform according to requirements, and should modeling and maintain a basic model of the power grid according to relevant formats. The new energy station model is provided, which mainly includes the primary equipment topological relations (including the positive sequence and zero sequence network topologies), the primary equipment parameters (including the equipment of the main transformer, ground transformer, and capacitor, etc.), the secondary model of the new energy station, and the secondary equipment parameters. The graphics of the new energy station are set up, which include a main power grid wiring diagram and a station wiring diagram. The operating state and the operating method of the new energy station are provided. The models and parameter configurations of the wind power unit and the photovoltaic inverter are provided so as to build a complete equipment model, so that the graphical setting and calibration of the setting values can be realized.

Embodiment 2

Figure 4:
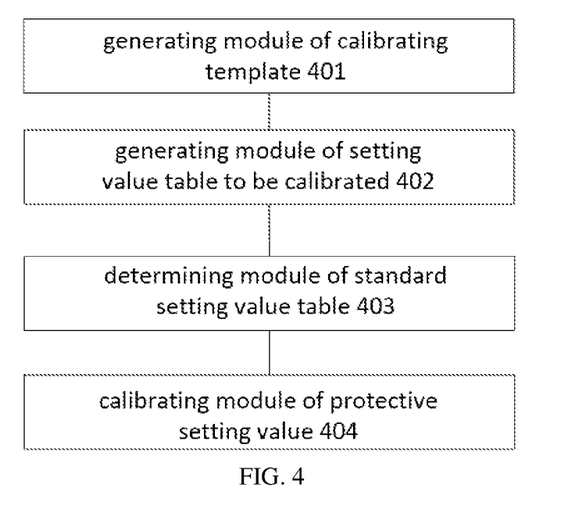
FIG. 4 shows a structure schematic diagram of calibrating system of setting value of grid-related relay protection of new energy station provided by another embodiment of the present disclosure.

Referring to FIG. 4, FIG. 4 shows the structure schematic diagram of a first calibrating system of setting value of grid-related relay protection of new energy station provided by the embodiment of the present disclosure. The system includes the generating module of calibrating template 401, the generating module of setting value table to be calibrated 402, the determining module of standard setting value table 403, and the calibrating module of protective setting value 404.

The generating module of calibrating template is configured to generate a setting value calibrating template of a target new energy station based on names of each of protective setting value items and the units of each of protective setting value items of the target new energy station.

The generating module of setting value table to be calibrated is configured to generate a setting value table to be calibrated of the target new energy station based on actual values of each of the protective setting value items input by the user and the setting value calibrating template.

The determining module of standard setting value table is configured to determine a standard setting value table of the target new energy station from a protective setting value calibration database according to a new energy station number of the target new energy station, wherein the standard setting value table includes standard values of each of the protective setting value items of the target new energy station.

The calibrating module of protective setting value is configured to calibrate the setting value table to be calibrated according to the standard setting value table.

In a feasible embodiment, the setting value calibrating template includes a plurality of items, wherein each of the protective setting value items is the name and the unit of one protective setting value item.

When configured to generate the setting value table to be calibrated of the target new energy station based on actual values of each of the protective setting value items input by the user and the setting value calibrating template, the generating module of setting value table to be calibrated is specifically configured to:
  add, for each of the protective setting value items, the actual values of the protective setting value item into the item in the setting value calibrating template where the name of the protective setting value item is located, so as to obtain the setting value table to be calibrated.

In a feasible embodiment, when configured to calibrate the setting value table to be calibrated according to the standard setting value table, the calibrating module of protective setting value is specifically configured to:
  determine whether the actual value of the protective setting value item in the setting value table to be calibrated is the same as a standard value of the protective setting value item in the standard setting value table for each of the protective setting value items; and
  update the actual value of the protective setting value item in the setting value table to be calibrated by utilizing the standard value of the protective setting value item, so as to obtain an optimized setting value table, if the actual value of the protective setting value item in the setting value table to be calibrated is different from the standard value of the protective setting value item in the standard setting value table.

Figure 5:
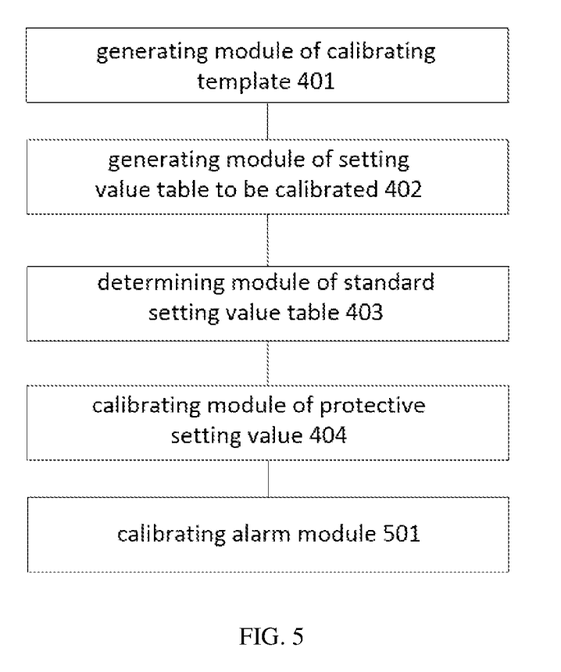
FIG. 5 shows a structure schematic diagram of another calibrating system of setting value of grid-related relay protection of new energy station provided by another embodiment of the present disclosure.

In a feasible embodiment, referring to FIG. 5, FIG. 5 shows the structure schematic diagram of another calibrating system of setting value of grid-related relay protection of new energy station provided by the embodiment of the present disclosure, wherein the system further includes a calibrating alarm module 501.

The calibrating alarm module is configured to send the alarm message to the user or send the alarm warning tone to the user, if the actual value of the protective setting value item in the setting value table to be calibrated is different from the standard value of the protective setting value item in the standard setting value table.

Figure 6:
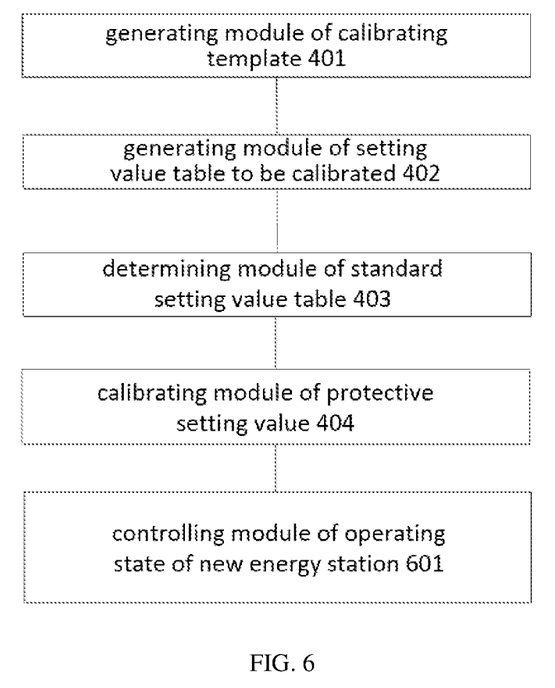
FIG. 6 shows a structure schematic diagram of another calibrating system of setting value of grid-related relay protection of new energy station provided by another embodiment of the present disclosure.

In a feasible embodiment, referring to FIG. 6, FIG. 6 shows the structure schematic diagram of another calibrating system of setting value of grid-related relay protection of new energy station provided by the embodiment of the present disclosure, wherein the system further includes a controlling module of operating state of new energy station 601.

The controlling module of operating state of new energy station is configured to control the operating state of the target new energy station by utilizing the optimized setting value table, after the calibrating module of protective setting value updates the actual value of the protective setting value item in the setting value table to be calibrated by utilizing the standard value of the protective setting value item and obtains the optimized setting value table.

In a feasible embodiment, the controlling module of operating state of new energy station is further configured to control, if the actual value of the protective setting value item in the setting value table to be calibrated is the same as the standard value of the protective setting value item in the standard setting value table, the operating state of the target new energy station by utilizing the setting value table to be calibrated, after the calibrating module of protective setting value determines whether the actual value of the protective item in the setting value table to be calibrated is the same as the standard value of the protective setting value item in the standard setting value table.

Figure 7:
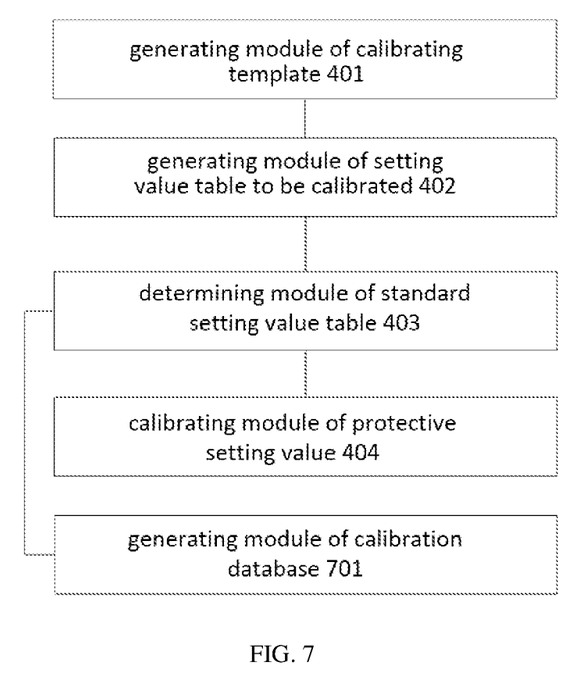
FIG. 7 shows a structure schematic diagram of another calibrating system of setting value of grid-related relay protection of new energy station provided by another embodiment of the present disclosure.

In a feasible embodiment, referring to FIG. 7, FIG. 7 shows the structure schematic diagram of another calibrating system of setting value of grid-related relay protection of new energy station provided by the embodiment of the present disclosure, wherein the system further comprises a generating module of calibration database 701.

The generating module of calibration database is configured to recognize the text of the contents included in the technical regulations for which the photovoltaic power station is accessed into the power system and the technical regulation for which the wind power station is accessed into the power system and obtain the recognition result, before the step of determining the standard setting value table of the target new energy station from the protective setting value calibration database by the determining module of standard setting value table according to the new energy station number of the target new energy station.

The generating module of calibration database is further configured to generate the protective setting value calibration database according to the recognition result.

The calibrating system of setting value of grid-related relay protection of new energy station provided by the embodiments of the present disclosure can be specific hardware on equipment, or software or firmware installed on the equipment, etc. The system provided by the embodiments of the present disclosure has the same realization principles and the same technical effects as the foregoing method embodiments. For a brief description, where not mentioned in the embodiment of the system, reference can be made to the corresponding contents in the foregoing method embodiments. It can be clearly understood by those skilled in the art, for the convenience and brevity of the description, the specific working processes of the foregoing system, device, and units all can be referred to the corresponding processes in the foregoing embodiments of the method, and will not be repeated herein.

It should be understood that the disclosed system and method provided in the embodiments of the present disclosure can be realized in other ways. The embodiments of the system described above are merely schematic. For example, the units are only divided by a logical and functional division, which can be divided in other ways when actually realized; for example, the plurality of units or components can be combined or integrated into another system, and some features can be ignored or not executed.

Additionally, the displayed or discussed coupling, whether direct or indirect, or communication connections between them, can be achieved through communication interfaces, devices, or units. These connections can take various forms, including electrical, mechanical, or other forms.

The units illustrated as separated components can be and also cannot be physically separated, and the components shown as units can be and also cannot be physical units, that is, they may be located in a same place, or they can also be distributed over the plurality of network units. Some or all of the units can be selected to realize the objective of the solution in the embodiments according to actual needs.

Additionally, each of the functional units of the embodiments provided by the present disclosure can be integrated into a processing unit, or each of the units can be existed separately and physically, or the two or more of units can be integrated into one unit.

If the functions are realized in form of a software functional unit and are sold or used as a separate product, they can be stored in a computer-readable storage medium. Based on this understanding, the essence of the technical solutions or the parts that contribute to the prior art or the part of the technical solutions of the present disclosure can be embodied in form of software products. The computer software products are stored in a storage medium, which includes a plurality of instructions to allow a computer device (which can be a personal computer, server, or network device, etc.) to execute all or some steps of the method described in the each of the embodiments in the present disclosure. The foregoing storage medium includes USB flash disks, removable hard disks, ROM (Read-Only Memory), RAM (Random Access Memory), disks, compact disks, or other medium can store program codes.

It should be noted that similar symbols and letters indicate similar items in the following drawings. Therefore, once an item is defined in a drawing, no further definition or illustration is required in subsequent drawings. Furthermore, the terms "first", "second", "third", etc., are used only to differentiate between descriptions, which are not to be understood as indicative or suggestive of the relative importance.

Finally, it should be noted that the foregoing embodiments are only specific embodiments of the present disclosure to illustrate the technical solutions of the present disclosure, and are not to limit them. The scope of protection of the present disclosure is not limited thereto, although the present disclosure is described in detail with reference to the foregoing embodiments. Those ordinarily skilled in the art should be understood that in the technical scope disclosed by the present disclosure, any person skilled in the art familiar with the technical field can still make modifications or easily think of changes for the technical solutions recorded in the foregoing embodiments, or make equivalent substitutions for partial technical features therein. These modifications, changes, or substitutions do not take the essence of the corresponding technical solutions out of the spirit and scope of the technical solutions of the embodiments of the present disclosure, which shall all be covered by the scope of protection of the present disclosure. Therefore, the scope of protection of the present disclosure shall be subject to the scope of protection of claims.

What is claimed is:

1. A calibrating method of a setting value of a grid-related relay protection of a new energy station, applicable to a calibrating system of the setting value of the grid-related relay protection of the new energy station, wherein the system comprises a generating module of a calibrating template, a generating module of a setting value table to be calibrated, a determining module of a standard setting value table, and a calibrating module of a protective setting value; and the method comprises generating a setting value calibrating template of a target new energy station by the generating module of the calibrating template based on names of each of protective setting value items and units of each of the protective setting value items of the target new energy station;

generating the setting value table to be calibrated of the target new energy station by the generating module of the setting value table to be calibrated based on actual values of each of the protective setting value items input by a user and the setting value calibrating template;

determining the standard setting value table of the target new energy station from a protective setting value calibration database by the determining module of the standard setting value table according to a new energy station number of the target new energy station, wherein the standard setting value table comprises standard values of each of the protective setting value items of the target new energy station; and calibrating the setting value table to be calibrated by the calibrating module of the protective setting value according to the standard setting value table.

2. The method according to claim 1, wherein the setting value calibrating template comprises a plurality of items, and each of the items comprises a name and a unit of one protective setting value item; and the step of generating the setting value table to be calibrated of the target new energy station by the generating module of the setting value table to be calibrated based on actual values of each of the protective setting value items input by a user and the setting value calibrating template comprises the generating module of the setting value table to be calibrated adding, for each of the protective setting value items, an actual value of the protective setting value item into an item in the setting value calibrating template where a name of the protective setting value item is located, so as to obtain the setting value table to be calibrated.

3. The method according to claim 1, wherein the step of calibrating the setting value table to be calibrated by the calibrating module of the protective setting value according to the standard setting value table comprises determining whether an actual value of a protective setting value item in the setting value table to be calibrated is the same as a standard value of the protective setting value item in the standard setting value table by the calibrating module of the protective setting value for each of the protective setting value items; and updating the actual value of the protective setting value item in the setting value table to be calibrated by utilizing the standard value of the protective setting value item by the calibrating module of the protective setting value, so as to obtain an optimized setting value table, when the actual value of the protective setting value item in the setting value table to be calibrated is different from the standard value of the protective setting value item in the standard setting value table.

4. The method according to claim 3, wherein the system further comprises a calibrating alarm module, wherein when the actual value of the protective setting value item in the setting value table to be calibrated is different from the standard value of the protective setting value item in the standard setting value table, the method further comprises
sending an alarm message to the user by the calibrating alarm module; or,
sending an alarm warning tone to the user by the calibrating alarm module.

5. The method according to claim 3, wherein the system further comprises a controlling module of an operating state of the new energy station, and after the step of updating the actual value of the protective setting value item in the setting value table to be calibrated by utilizing the standard value of the protective setting value item by the calibrating module of the protective setting value, so as to obtain an optimized setting value table, the method further comprises
controlling an operating state of the target new energy station by the controlling module of the operating state of the new energy station by utilizing the optimized setting value table.

6. The method according to claim 5, wherein after the step of determining whether an actual value of a protective setting value item in the setting value table to be calibrated is the same as a standard value of the protective setting value item in the standard setting value table by the calibrating module of the protective setting value, the method further comprises
controlling the operating state of the target new energy station by the controlling module of the operating state of the new energy station by utilizing the setting value table to be calibrated, when the actual value of the protective setting value item in the setting value table to be calibrated is the same as the standard value of the protective setting value item in the standard setting value table.

7. The method according to claim 1, wherein the system further comprises a generating module of a calibration database, before the step of determining the standard setting value table of the target new energy station from a protective setting value calibration database by the determining module of the standard setting value table according to a new energy station number of the target new energy station, the method further comprises
recognizing a text of contents comprised in technical regulations for which a photovoltaic power station is accessed into a power system and technical regulations for which a wind power station is accessed into the power system by the generating module of the calibration database and obtaining a recognition result; and
generating the protective setting value calibration database according to the recognition result by the generating module of the calibration database.

8. A calibrating system of a setting value of a grid-related relay protection of a new energy station, wherein the system comprises a generating module of a calibrating template, a generating module of a setting value table to be calibrated, a determining module of a standard setting value table, and a calibrating module of a protective setting value, wherein the generating module of the calibrating template is configured to generate a setting value calibrating template of a target new energy station based on names of each of protective setting value items and units of each of the protective setting value items of the target new energy station;

the generating module of the setting value table to be calibrated is configured to generate the setting value table to be calibrated of the target new energy station based on actual values of each of the protective setting value items input by a user and the setting value calibrating template;

the determining module of the standard setting value table is configured to determine the standard setting value table of the target new energy station from a protective setting value calibration database according to a new energy station number of the target new energy station, wherein the standard setting value table comprises standard values of each of the protective setting value items of the target new energy station; and the calibrating module of the protective setting value is configured to calibrate the setting value table to be calibrated according to the standard setting value table.

9. The system according to claim 8, wherein the setting value calibrating template comprises a plurality of items, and each of the items comprises a name and a unit of one protective setting value item; and when configured to generate the setting value table to be calibrated of the target new energy station based on the actual values of each of the protective setting value items input by the user and the setting value calibrating template, the generating module of the setting value table to be calibrated is configured to add, for each of the protective setting value items, an actual value of the protective setting value item into an item in the setting value calibrating template where a name of the protective setting value item is located, so as to obtain the setting value table to be calibrated.

10. The system according to claim 8, wherein when configured to calibrate the setting value table to be calibrated according to the standard setting value table, the calibrating module of the protective setting value is configured to determine whether an actual value of the protective setting value item in the setting value table to be calibrated is the same as a standard value of the protective setting value item in the standard setting value table for each of the protective setting value items; and update the actual value of the protective setting value item in the setting value table to be calibrated by utilizing the standard value of the protective setting value item, so as to obtain an optimized setting value table, when the actual value of the protective setting value item in the setting value table to be calibrated is different from the standard value of the protective setting value item in the standard setting value table.

* * * * *